United States Patent
Ke

(10) Patent No.: US 8,142,926 B2
(45) Date of Patent: Mar. 27, 2012

(54) PORTABLE COMPUTER AND BATTERY DEVICE THEREOF

(75) Inventor: Lian-Tien Ke, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1239 days.

(21) Appl. No.: 11/300,450

(22) Filed: Dec. 15, 2005

(65) Prior Publication Data

US 2006/0141345 A1 Jun. 29, 2006

(30) Foreign Application Priority Data

Dec. 29, 2004 (TW) ................. 93141266 A

(51) Int. Cl.
  *H01M 2/10* (2006.01)
  *H01M 2/00* (2006.01)
  *H01M 4/82* (2006.01)
  *H01M 6/00* (2006.01)
(52) U.S. Cl. .......... 429/186; 429/96; 429/163; 29/623.1
(58) Field of Classification Search ................. 429/176, 429/177, 185, 186, 163, 96; 29/623.1
See application file for complete search history.

(56) References Cited

U.S. PATENT DOCUMENTS 5,901,035 A 5/1999 Foster et al.
6,191,941 B1 * 2/2001 Ito et al. ................... 361/679.27

FOREIGN PATENT DOCUMENTS

| CN | 1405654 | 3/2003 |
|---|---|---|
| EP | 1030239 | 8/2000 |
| JP | 11120972 | 4/1999 |

* cited by examiner

*Primary Examiner* — Patrick Ryan
*Assistant Examiner* — Julian Anthony
(74) *Attorney, Agent, or Firm* — Muncy, Geissler, Olds & Lowe, PLLC

(57) ABSTRACT

A battery device includes a containing shell, a first battery set, and a second battery set. The battery device is configured on an electronic device along an assembling plane. The containing shell has a first containing portion and a second containing portion, which are disposed abreast with each other and form an angle with the assembling plane. The first battery set is disposed in the first containing portion, and the second battery set is disposed in the second containing portion.

14 Claims, 6 Drawing Sheets

PORTABLE COMPUTER AND BATTERY DEVICE THEREOF

BACKGROUND OF THE INVENTION

1. Field of Invention

The invention relates to a portable computer and battery device thereof and, in particular, to a portable computer with an exposed battery device and the battery device.

2. Related Art

The portable computer is a kind of portable personal information devices. In addition to a fixed power cord, it also has a built-in battery set. Therefore, the user can move and operate it anywhere, even outdoors, by using the battery power without being restricted by the fixed power cord.

However, as users need the batteries capable of operating the lasting time, manufacturers usually increase the number of cells inside the battery set. Nevertheless, this also increases the volume and weight of the battery. This method is against the idea of providing compact electronic devices nowadays. This may also affect the design of other components in the computer.

As shown in FIG. 1, a conventional portable computer 1 usually has a battery device 12 installed inside the host 11. At the bottom of the portable computer host 11, a battery containing portion 13 is provided for the battery device 12 to provide the power. The designers usually do not design the shapes of the battery device 12 and the portable computer 1. Instead, they simply design a containing portion at the bottom of the host 11. If the number of battery devices 12 increases, most space is needed to accommodate the battery devices 12. Thus, the size of the portable computer 1 has to be enlarged.

It is therefore an important subject to increase the battery lasting time by increasing the number of cells without increasing the volume of the portable computer.

SUMMARY OF THE INVENTION

In view of the foregoing, the invention provides a portable computer with a compact size and a battery device thereof.

To achieve the above, an embodiment of the invention provides a battery device including a containing shell, a first battery set, and a second battery set. The battery device is configured on the electronic device along an assembling plane. The containing shell has a first containing portion and a second containing portion. The first containing portion and the second containing portion are disposed abreast with each other and form an angle with the assembling plane. The first battery set is disposed in the first containing portion and the second battery set is disposed in the second containing portion.

To achieve the above, an embodiment portable of the invention provides a portable computer including a pivoting portion, a battery device containing portion, and a battery device. The portable computer has a display, and a host machine. The pivoting portion connects the display and the host machine. The battery device containing portion is positioned adjacent to the pivoting portion. The battery device is disposed inside the battery device containing portion. The battery device is configured on the host machine along an assembling plane. The battery device includes a containing shell, a first battery set, and a second battery set. The containing shell has a first containing portion and a second containing portion. The first containing portion and the second containing portion are disposed abreast with each other and form an angle with the assembling plane. The first battery set is disposed in the first containing portion and the second battery set is disposed in the second containing portion.

As described above, the first containing portion and the second containing portion for accommodating the battery sets inside the battery device are disposed in a non-horizontal way (in comparison with the assembling plane) and form an angle with the assembling plane. The battery device is configured at the pivoting portion of the display and the host machine. Therefore, the battery device can be integrally designed with the whole portable computer, and it is unnecessary to increase the size of the portable computer. This can reduce the cost while keeping an integrated shape, as well as the beautiful appearance is presented.

BRIEF DESCRIPTION OF THE DRAWINGS

The invention will become more fully understood from the detailed description given herein below illustration only, and thus is not limitative of the present invention, and wherein:

FIGS. 3A and 3B are schematic views of the battery device according to the preferred embodiment of the invention, wherein FIG. 3B shows a side view of the battery device;

DETAILED DESCRIPTION OF THE INVENTION

The present invention will be apparent from the following detailed description, which proceeds with reference to the accompanying drawings, wherein the same references relate to the same elements.

Figure 2:
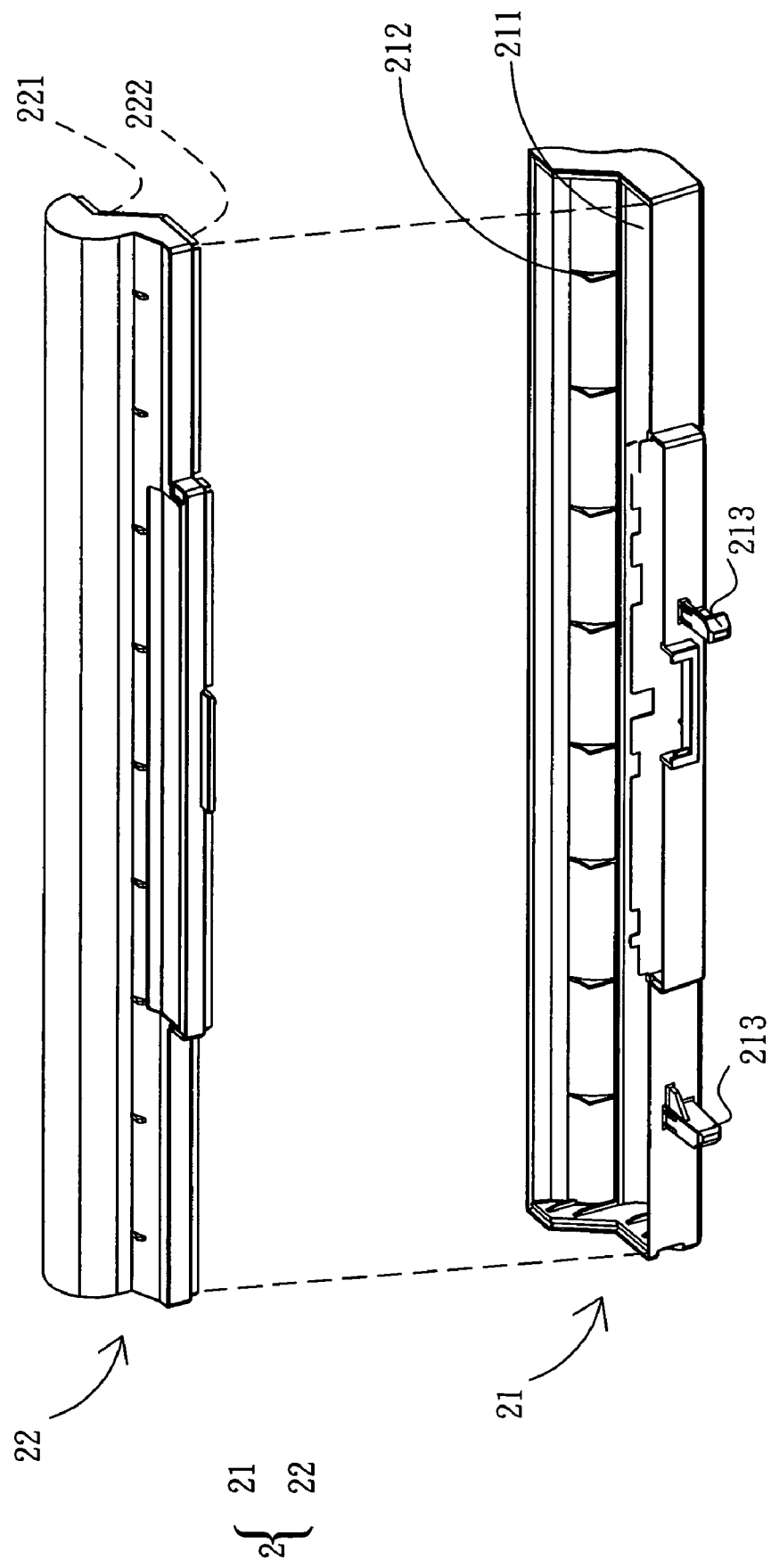
FIG. 2 is an exploded view of a battery device according to a preferred embodiment of the invention.

With reference to FIG. 2, a battery device 2 according to a preferred embodiment of the invention is configured on an electronic device via a connecting portion 213. It includes a first shell 21 and a second shell 22. The battery device 2 has an assembling plane $P_2$ (as shown in FIG. 3B). In this embodiment, the connecting portion 213 is installed on the first shell 21. Certainly, it can be installed at any position on the battery device 2 according to the needs.

The first shell 21 has a first concave portion 211, a first fixing portion 212, and a connecting portion 213. The first fixing portion 212 is installed adjacent to the first concave portion 211. The connecting portion 213 is connected to the electronic device.

Figure 3A:
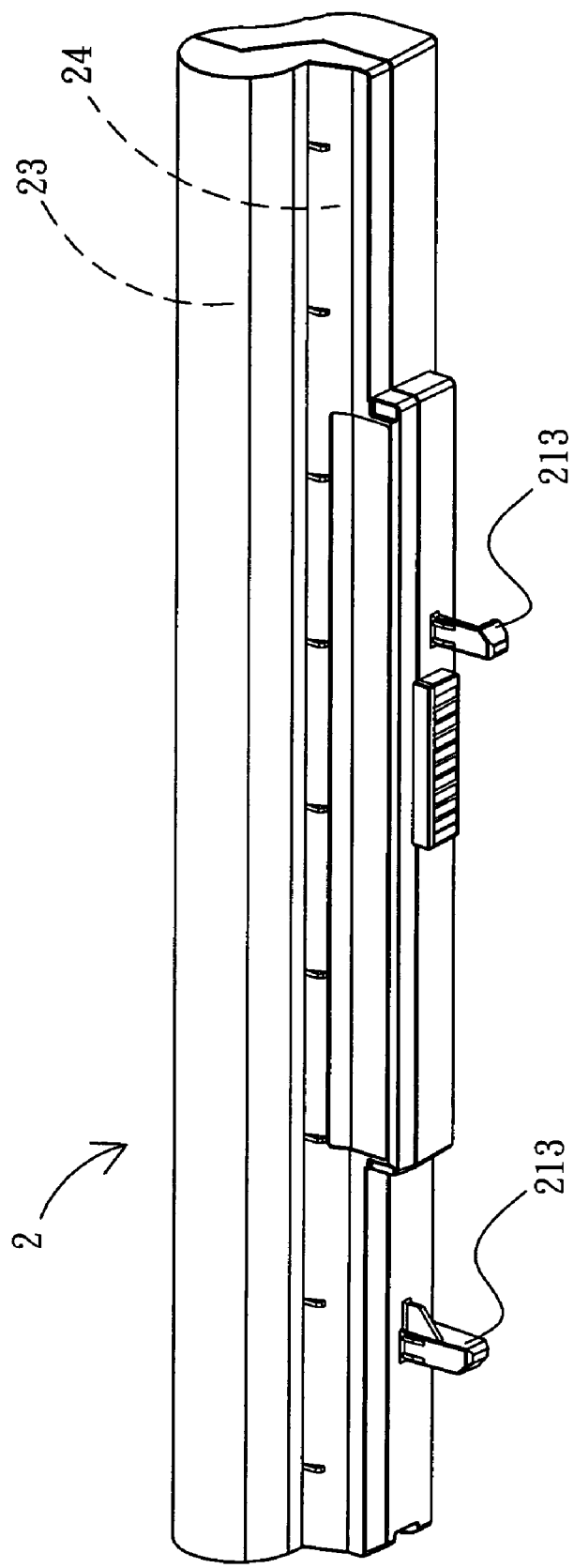
Figure 3B:
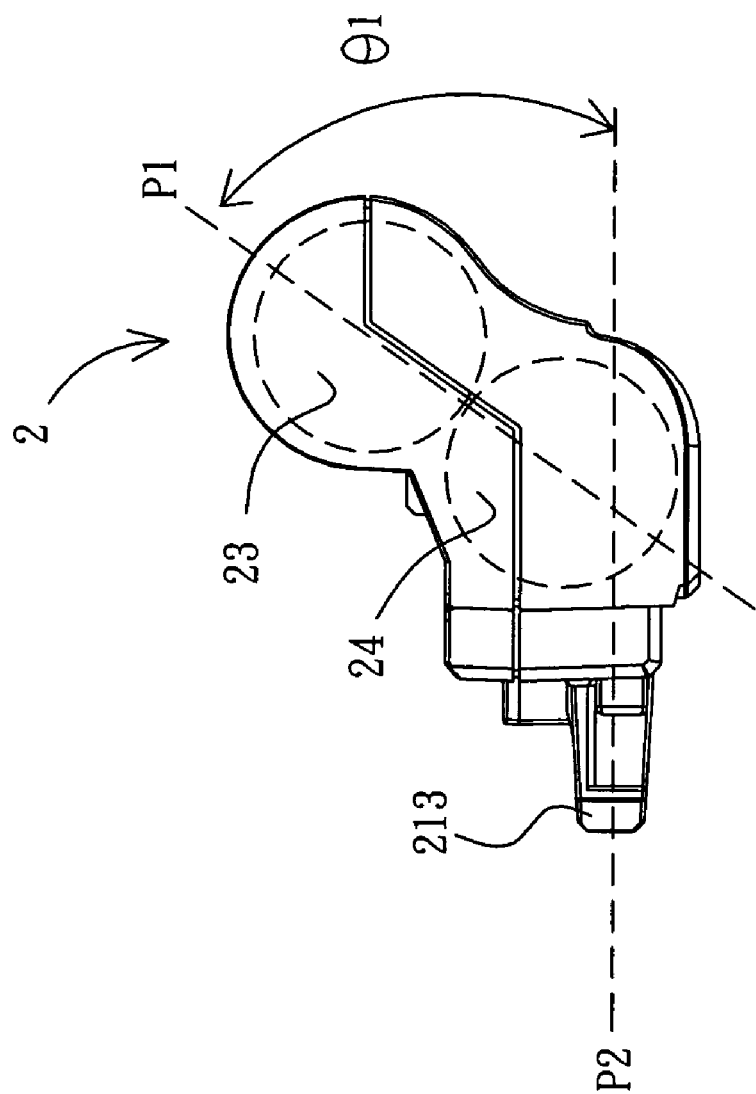

As shown in FIGS. 3A and 3B, the second shell 22 has a second concave portion 221 and a second fixing portion 222. The second concave portion 221 is installed opposite to the first fixing portion 212 so as to form a first containing portion 23. The second fixing portion 222 is installed opposite to the first concave portion 211 so as to form a second containing portion 24. In this embodiment, the first shell 21 and the second shell 22 can be connected by the method of gluing, locking, or clicking. The first containing portion 23 and the second containing portion 24 are installed abreast to each other and form a setting plane $P_1$ (as shown in FIG. 3B), which has an angle of $\theta_1$ (as shown in FIG. 3B) relative to the assembling plane $P_2$ composed of the battery device 2 and the electronic device. In general, the angle $\theta_1$ can be roughly between 10 degrees and 90 degrees. In more precise, the angle θ1 is between 30 degrees and 60 degrees. In this embodiment, the angle θ1 is 45 degrees.

Figure 4:
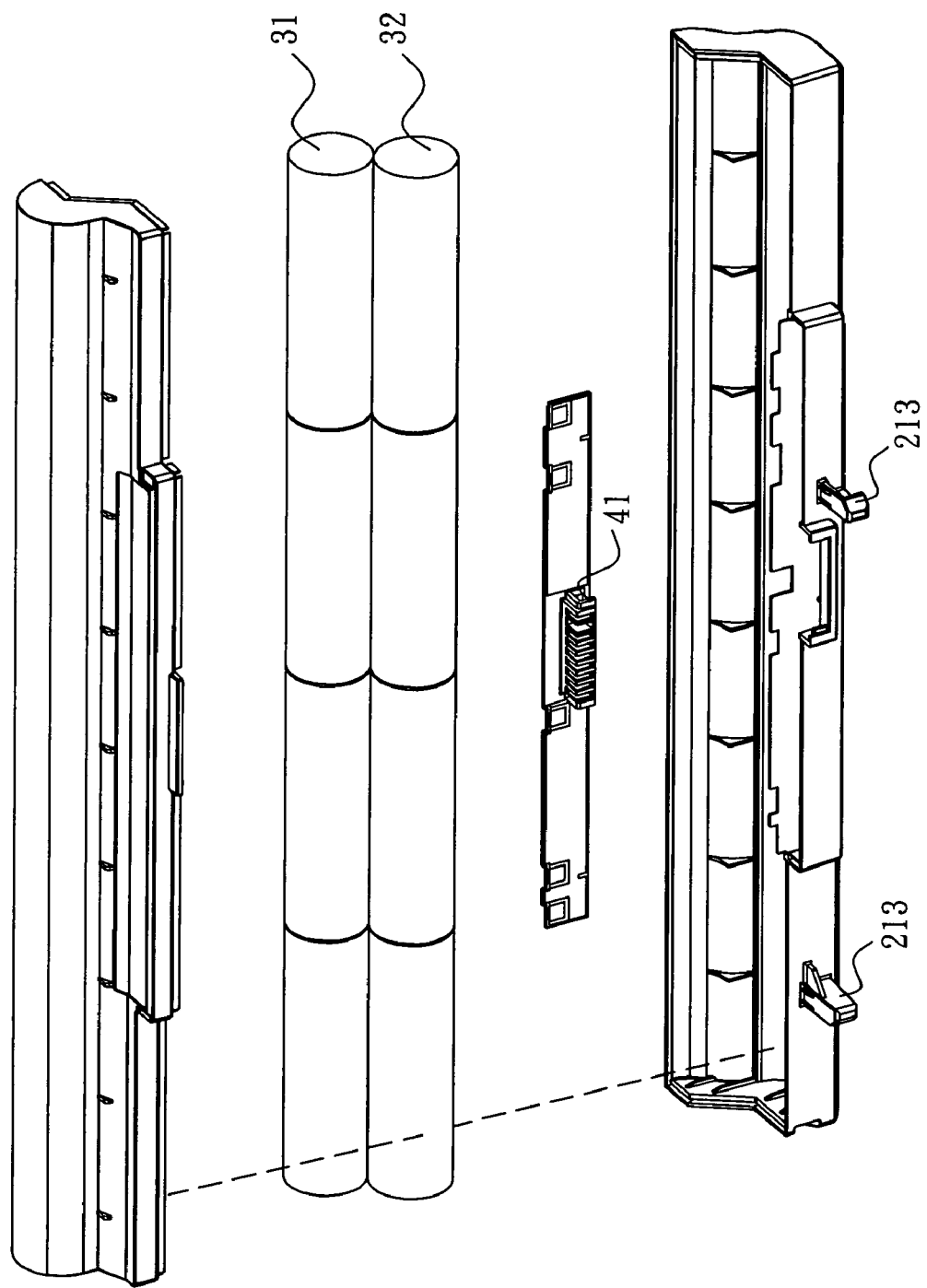
FIG. 4 is an exploded view of another battery device according to the preferred embodiment of the invention.

With reference to FIG. 4, the battery device 2 in this embodiment further includes a first battery set 31, a second battery set 32, and several electrical terminals 41. The first battery set 31 is installed inside the first containing portion 23, and the second battery set 32 is installed in the second containing portion 24. The electrical terminals 41 are installed on the battery device 2, on either the first shell 21 or the second shell 22 for electrically connecting to the electronic device. They are used to transmit electrical power or signals. For example, the electrical terminals 41 can be used to supply power to the electronic device or to charge the battery sets, or even to transmitting the signal of detecting the capacity of the battery sets. Thus, after a proper design, the electrical terminals 41 can be used to transmit either power or signals.

To make the portable computer and the battery device thereof of the invention more comprehensive, an example showing that the battery device 2 is applied to a portable computer will be described hereinafter.

Figure 5:
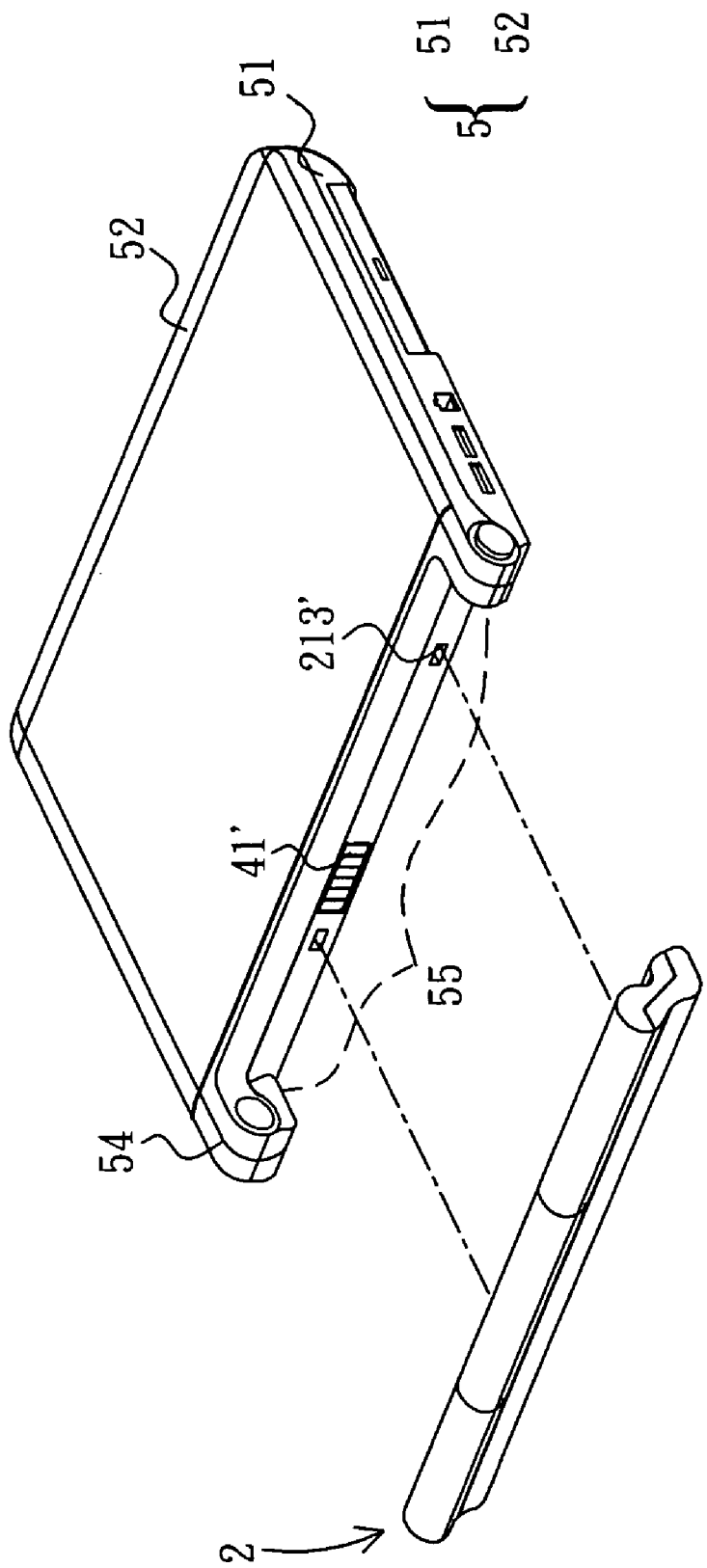
FIG. 5 is a schematic view of a portable computer including the battery device according to the preferred embodiment of the invention.

As shown in FIG. 5, the portable computer 5 of the invention includes a host machine 51 and a display 52. The portable computer further includes a pivoting portion 54, a battery device containing portion 55, and a battery device 2. In this embodiment, the pivoting portion 54 connects the host machine 51 and the display 52. The battery device containing portion 55 is formed on the host 51. For example, the battery device containing portion 55 is installed adjacent to the pivoting portion 54. The battery device 2 is as described above. It is disposed inside the battery device containing portion 55. In the current embodiment, the battery device 2 can be installed inside the battery device containing portion 55 and connected to the portable computer 5 by the method of clicking or locking. In addition, for example, the battery device 2 is provided to the battery device containing portion 55 of the portable computer 5, and then the battery device 2 is assembled to the battery device containing portion 55 of the portable computer 5. The battery device 2 has a first battery set and a second battery set, when the battery device 2 is assembled to the battery device containing portion 55, a non-horizontal plane relatively to a plane of the host 51 is formed between the first battery set and the second battery set.

In this embodiment, the battery device containing portion 55 of the portable computer 5 further includes an auxiliary connecting portion 213' and conducting terminals 41'. The auxiliary connecting portion 213' is used to connect the connecting portion 213 of the battery device 2. The conducting terminals 41' are used to electrically connect to the electrical terminals 41 of the battery device 2 for transmitting power or signals between the portable computer 5 and the battery device 2.

Figure 1:
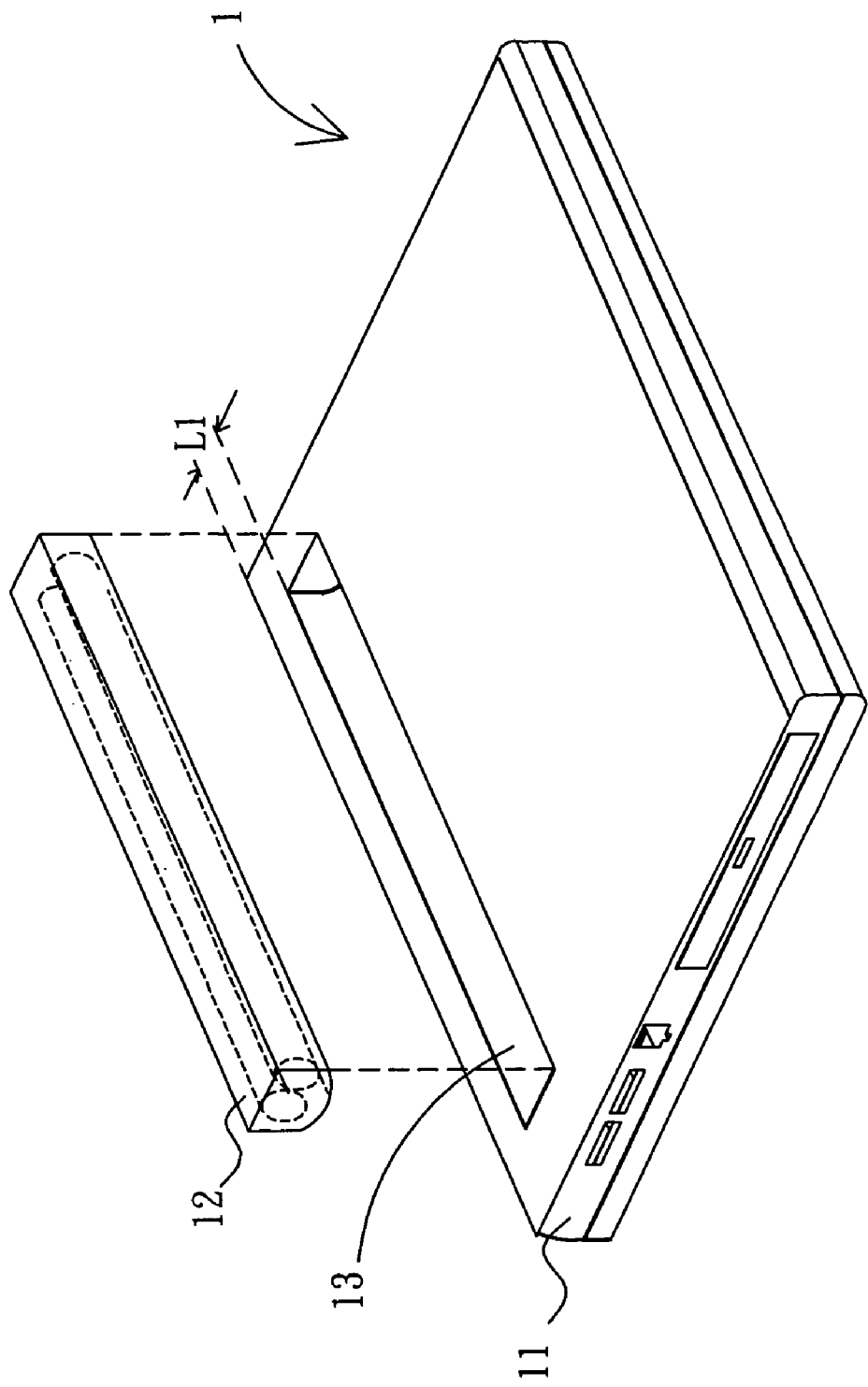
FIG. 1 is a schematic view of the battery device configured in the conventional portable computer.

In summary, the portable computer and the battery device thereof have a non-horizontal (in comparison with the assembling plane) design of the containing portions for the disposition of the battery sets. Thus, the battery device can be integrated into one side of the pivoting portion between the display and the host machine. This design differs from the conventional design, which disposes the battery in the recession inside the host machine. In the invention, the space for accommodating the additional battery, which is for extending the lasting time, is unnecessary. The battery device design of the invention can cut the length L1 of the conventional host machine (as shown in FIG. 1). This can save the production cost and make the products more competitive on the market.

In comparison with the conventional design, the portable computer and the battery device thereof of the invention have the following advantages:

1. Since the battery device of the invention is not designed inside the host machine of the portable computer, the length of the host machine can be reduced to render a compact electronic product.

2. The battery device of the invention is integrated in the pivoting portion between the display and the host machine, the material for the original pivoting portion can be saved. Therefore, both the cost and weight of the laptop are reduced, which encourages the consumer's purchase.

3. The battery device of the invention along with the shape of the portable computer allow more versatile designs, so that the portable computer has a more beautiful appearance to attract consumers, and is more comfortable for human body while carrying.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic device with a display and a host, comprising:
    a pivoting portion connecting the display to the host;
    a battery device containing portion formed on the host; and
    a battery device having a single space, a first battery set and a second battery set,
    wherein when the battery device is assembled to the battery device containing portion, a non-horizontal non-rotatable plane relative to a plane of the host is formed between the first battery set and the second battery set, the first battery set and the second battery set are stacked along the non-horizontal non-rotatable plane in the single space.

2. The electronic device of claim 1, wherein the battery device comprises:
    a first shell having a first concave portion and a first fixing portion disposed adjacent to the first concave portion; and
    a second shell connected to the first shell and having a second concave portion and a second fixing portion disposed adjacent to the second concave portion,
    wherein the first battery set is disposed in the first containing portion, and the second battery set is disposed in the second containing portion.

3. The electronic device of claim 2, wherein the first fixing portion is installed opposite to the second concave portion to form the first containing portion and the second fixing portion is installed opposite to the first concave portion to form the second containing portion.

4. The electronic device of claim 2, wherein the first shell and the second shell are connected using a method of gluing.

5. The electronic device of claim 2, wherein the first shell and the second shell are connected using a method of clicking.

6. The electronic device of claim 2, wherein the first shell and the second shell are connected using a method of locking.

7. The electronic device of claim 1, wherein a fixed angle between the non-horizontal plane and the plane of the host is between 30 degrees and 60 degrees.

8. The electronic device of claim 7, wherein the angle is 45 degrees.

9. The electronic device of claim 1, wherein the battery device is assembled to the battery device containing portion by a method of clicking.

10. The electronic device of claim 1, wherein the battery device is assembled to the battery device containing portion by a method of locking.

11. The electronic device of claim 1, wherein the battery device further comprises:
a plurality of electrical terminals installed for electrically connecting the electronic device to transmit power and signals.

12. The electronic device of claim 1, wherein the single space extends along the non-horizontal non-rotatable plane from the bottom to the top of the battery device.

13. A method for assembling an electronic device comprising:

providing a battery device to a battery device containing portion of the electronic device, wherein the battery device has a single space, a first battery set and a second battery set; and assembling the battery device to a battery device containing portion of the electronic device;

wherein a non-horizontal non-rotatable plane relative to a plane of the electronic device is formed between the first battery set and the second battery set, and the first battery set and the second battery set are stacked along the non-horizontal non-rotatable plane in the single space.

14. The method of claim 13, wherein the single space extends along the non-horizontal non-rotatable plane from the bottom to the top of the battery device.

* * * * *